(12) United States Patent
Liang et al.

(10) Patent No.: US 6,697,371 B1
(45) Date of Patent: Feb. 24, 2004

(54) NETWORK SWITCH WITH ON-BOARD MANAGEMENT INFORMATION BASED (MIB) COUNTERS

(75) Inventors: Chin-Wei Liang, Sunnyvale, CA (US); Tsai-Lung Lee, Union City, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/323,271

(22) Filed: Jun. 1, 1999

(51) Int. Cl.[7] .............................................. H04L 12/56
(52) U.S. Cl. ........................................ 370/401; 370/389
(58) Field of Search ................................ 370/401, 470, 370/422, 252–254, 398, 402, 465, 466, 471, 389; 711/104, 105, 169

(56) References Cited

U.S. PATENT DOCUMENTS

| | | | | |
|---|---|---|---|---|
| 5,515,376 A | * | 5/1996 | Murthy et al. | |
| 5,640,527 A | * | 6/1997 | Pecone et al. | 395/405 |
| 5,668,798 A | * | 9/1997 | Toubol et al. | 370/230 |
| 5,682,552 A | * | 10/1997 | Kuboki et al. | |
| 5,909,564 A | * | 6/1999 | Alexander et al. | 395/311 |
| 6,081,860 A | * | 6/2000 | Bridges et al. | 710/110 |
| 6,130,891 A | * | 10/2000 | Lam et al. | 370/401 |

* cited by examiner

Primary Examiner—Kenneth Vanderpuye

(57) ABSTRACT

A network switch having on-board MIB counters employs a random access memory to store statistics counters (MIB counters). The random access memory is a multiple port memory at which simultaneous read and write access operations may be performed. A pipeline is coupled to this memory to control the read and write accesses and prevent a simultaneous reading and writing of the same MIB counter at the same address in the memory.

11 Claims, 3 Drawing Sheets

US 6,697,371 B1

NETWORK SWITCH WITH ON-BOARD MANAGEMENT INFORMATION BASED (MIB) COUNTERS

FIELD OF THE INVENTION

The present invention relates to the field of network switches, and more particularly, to the storage of Management Information Based (MIB) objects related to the operation of a network switch.

BACKGROUND OF THE INVENTION

A data network switch permits data communication among a plurality of media stations in a local area network. Data frames or packets, are transferred between stations by means of data network switch Media Access Controllers (MACs). The network switch passes data frames received from a transmitting station to a destination station based on the header information and the received data frame. Packet transmission events typically are tracked to provide a basis for statistical analysis of network operation with respect to each data network switch port. For example, the number of transmitted packets, received packets, transmissions collisions, and the like can be counted and polled periodically. These significant parameters, called "objects", are collected in a Management Information Base (MIB). Through the use of statistical counters, determination can be made of improper device operations, such as, for example, loss of packets.

Conventionally, each MAC unit includes internal counters of limited capacity for counting a small number of MIB objects. Flip-flops are incremented each time an item is changed. The counted objects are output to readable registers. The increased MAC complexity owed to these components, coupled with a relatively limited MIB reporting functionality for this scheme, are significant disadvantages.

The implementation of MIB counters with flip-flops increases the size of the chip on which the network switch is implemented and therefore increases the cost of the chip. However, moving the storage of the MIB counters off-chip impacts the bandwidth of accesses to the memory. Furthermore, the operation of the MIB counters is significantly slowed by having to refer to the external memory with each operation involving the MIB counter.

Providing a random access based memory (RAM) on a network switch logic chip as a counter for MIB data received from all the MACs on the chip frees up the bandwidth memory and also allows the MIB counters to match speed with the on-chip MACs. A RAM based memory also reduces the costs of the chip in comparison to implementation of the MIB counters with flip-flops. However, the interfacing and operation of a RAM based MIB counter scheme conventionally requires a complicated arrangement to control read and write accesses to the MIB counters.

SUMMARY OF THE INVENTION

There is a need for a network switch that does not burden external memory bandwidth, and employs MIB counter control logic that is relatively less complex and ensures proper maintenance of the MIB counters.

This and other needs are met by embodiments of the present invention which provide a multiport network switch that maintains management information base (MIB) counters. The switch has a multiport random access memory which contains MIB counters at addressable locations in the memory. Read/write logic is coupled to the MIB counters to read and write specified MIB counters. The read/write logic includes a pipeline having an input that receives addresses of the MIB counter to be read or written.

In certain embodiments of the invention, control logic is provided that selectively prevents concurrent reading and writing of the same MIB counter. This allows a random access memory to be used, but at the same time prevents the reading of the MIB counter that is being updated. The pipeline is an elegant arrangement that is used in conjunction with the control logic to maintain the MIB counters on-chip and prevent the simultaneous reading and writing to the same address in the memory. Hence, some of the advantages of the present invention include fast access to the MIB counters, matching of the MIB counters to the speed of the MACs, (since the MIB counters may be located on the same chip as the MACs), and freeing up of the external memory bandwidth.

The earlier stated needs are met by another embodiment of the present invention which provides a MIB counter arrangement comprising a memory having MIB counters located at addresses in the memory, the memory being configured for simultaneous read and write accesses. A pipeline is provided having an input for receiving addresses and an output coupled to the memory for providing addresses to the memory. The pipeline has multiple stages for pipelining addresses received at the input. Control logic is provided for preventing simultaneous reading and writing to the same address in the memory.

Various objects and features of the present invention will become more readily apparent to those skilled in the art from the following description of a specific embodiment thereof, especially when taken in conjunction with the accompanying drawings.

DETAILED DESCRIPTION OF THE INVENTION

Switch Architecture Overview

Figure 1:
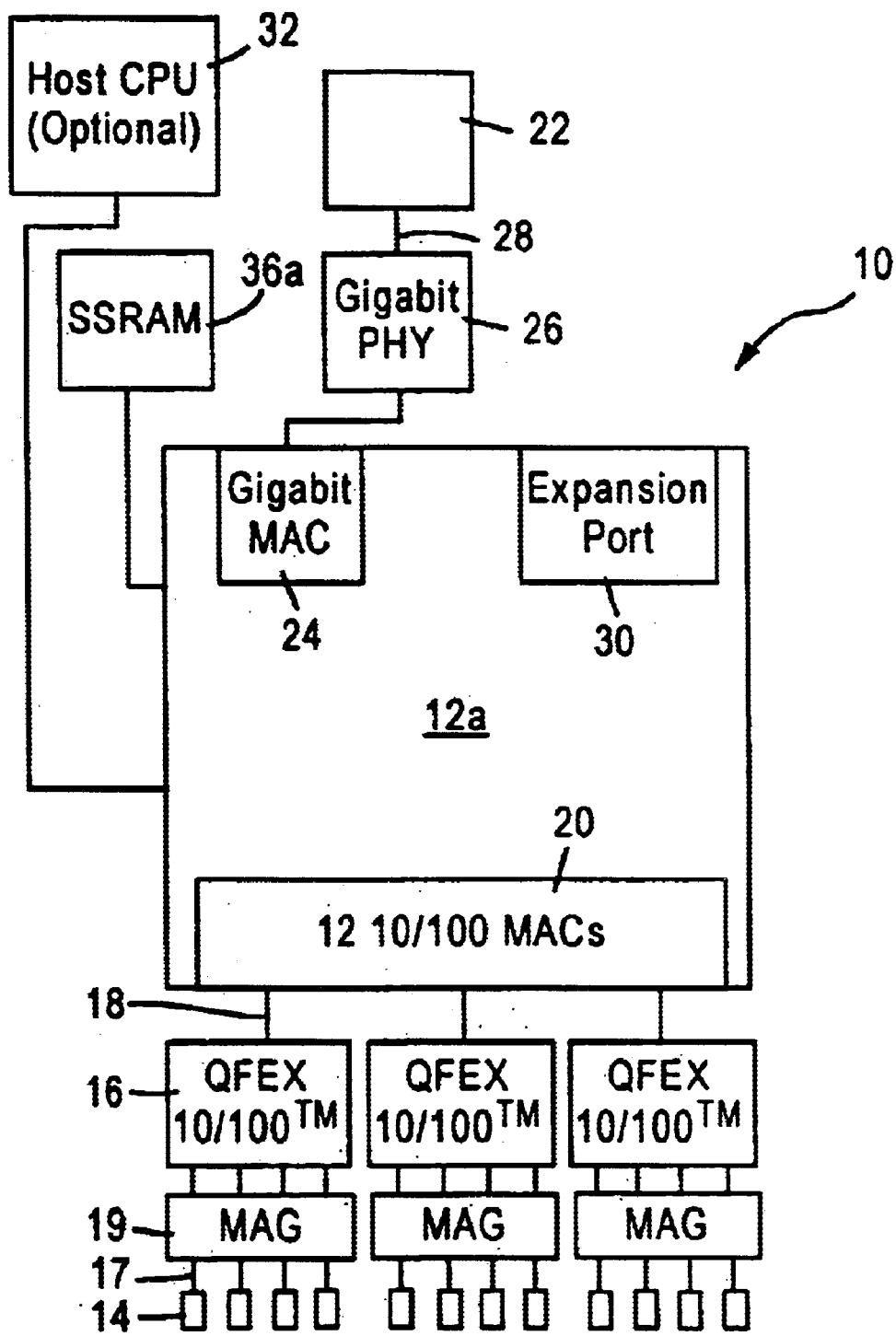
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes a integrated multiport switch (IMS) 12 that enables communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 may also include a gigabit MAC 24 for sending and receiving data packets to and from a gigabit PHY 26 for transmission to the gigabit node 22 via a high speed network medium 28.

Each10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
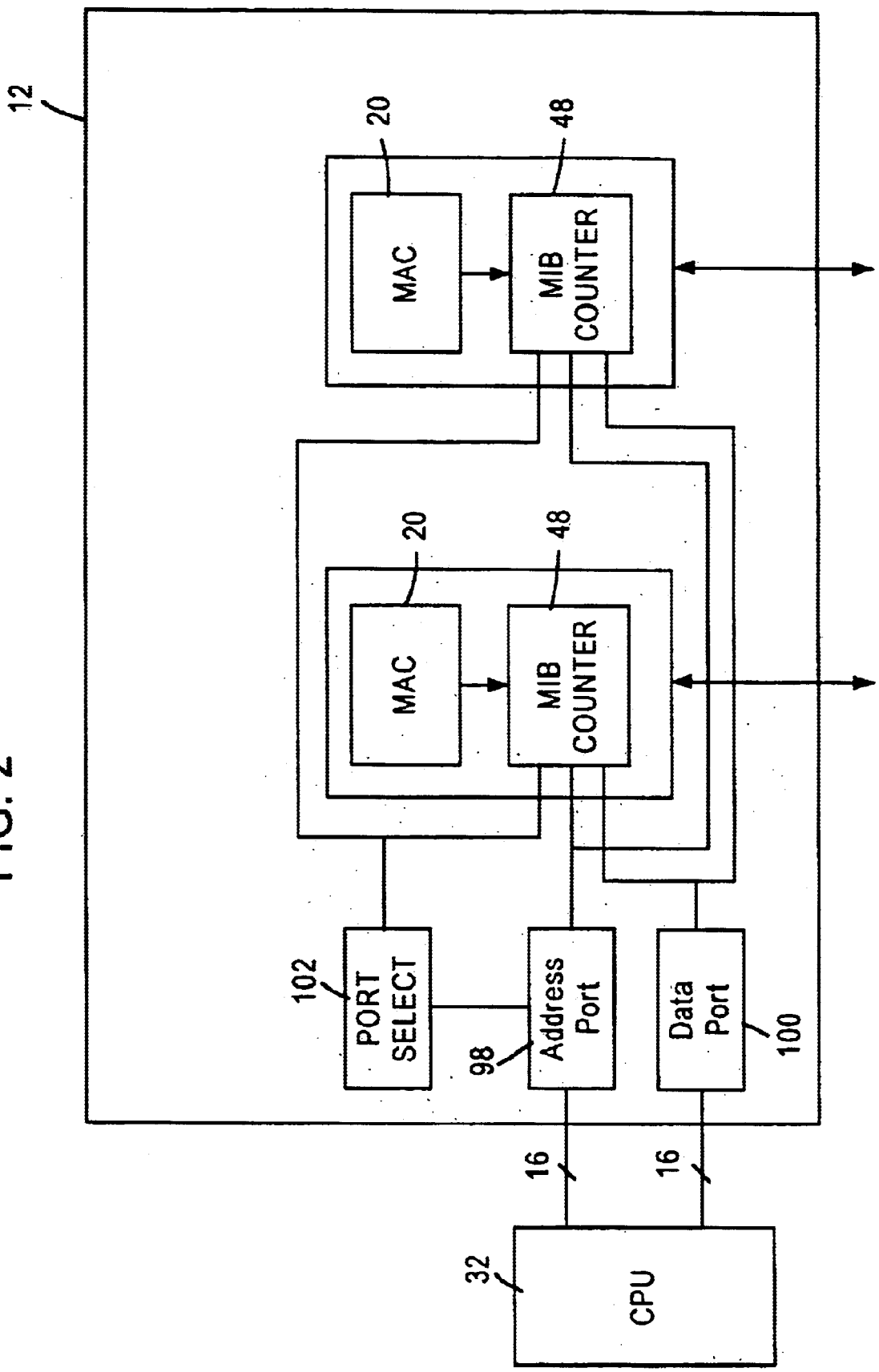
FIG. 2 is a block diagram of the multiport switch of FIG. 1, illustrating only certain elements of the switch and a CPU connected to the switch in accordance with embodiments of the present invention.

FIG. 2 is a block diagram of the switch 12, shown connected to a CPU 32. Only certain elements of the switch 12 are depicted in FIG. 2, so as to highlight certain features of the present invention. A MIB counter address port 98 and a MIB counter data port 100 are indirect registers that provide indirect access to MIB counters in the MIB counter arrangement 48. The registers are addressed by a CPU 32 using an index with an offset, where the index represents the port and the offset represents the individual counter. To access a given register, the host CPU 32 places the index (a four-bit number), and the offset (a seven-bit number) into the MIB counter address port 98. The CPU 32 then will read or write the MIB counter data port 100 two times in 16-bit reads or writes, as the data port 100 is a 32-bit port. Two CPU I/O operations are always required to access one MIB counter by the CPU 32. This is because the CPU interface bus is 16-bits wide while the MIB counters are 32-bits wide. The first read from the data port 100 launches the counter's contents into a temporary register and passes the two low order bytes of the data to the host CPU 32. The second read returns the two high order bytes. For a write access, the first write to the data port 100 launches two bytes of data in a temporary register. The second write copies two bytes of data from the host CPU 32 data bus to the upper half of the MIB counter and the other two bytes of data from the temporary register to the lower half of the counter.

A MIB counter arrangement 48 is provided for each of the individual ports in certain preferred embodiments. Thus, each MAC 20 is associated with an individual MIB counter arrangement 48. When the CPU 32 wishes to address the MIB counters of a particular port, that port is selected through port selection logic 102 based upon the index in the address port 98. For example, if there are 13 ports, the port selection logic 102 operates as a 4 to 13 decoder to provide a port selection signal to the MIB counter arrangement 48 of a particular port.

The MIB counter arrangement 48 of each port as shown in FIG. 2 maintains the management information base objects within counters located within the arrangement 48. The MIB counters are initialized by the CPU 32 upon start-up. It is preferred that a software reset will not affect the contents of the MIB counters.

In addition to reads and writes of the MIB counters by the CPU 32, the MIB counters are also accessed by the MAC 20 to update the counters to reflect event occurrences in the operation of the network. Hence, the MIB counter arrangement 48 must be able to be accessed by both the MACs 20 and the CPU 32. The MACs 20 update the information in the MIB counters 48, and the CPU 32 reads or writes these MIB counters in its role as manager of the network.

Figure 3:
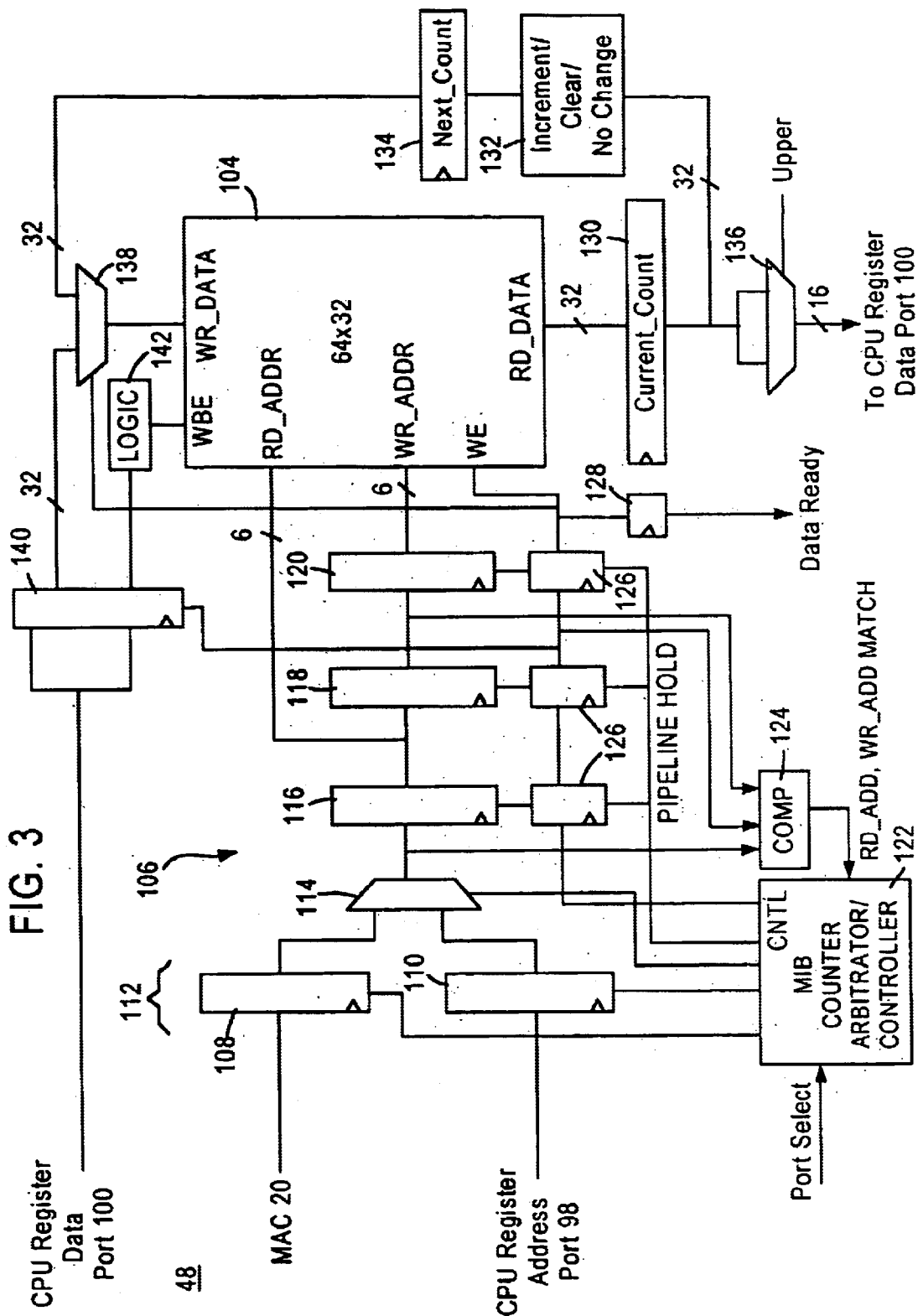
FIG. 3 is a block diagram of a MIB counter arrangement in accordance with an embodiment of the present invention.

FIG. 3 is a more detailed block diagram of an exemplary embodiment of the MIB counter arrangement 48 in accordance with an embodiment of the present invention. The MIB counter arrangement 48 includes a random access memory 104, such as a dual port RAM. The memory 104, in certain preferred embodiments, has 64 addressable entries, each entry having 32 bits. The memory may be a 66 MHz memory or an 83 MHz memory, etc. It is preferred that the memory operate at the same speed as the MAC 20 in order to match the memory to the MAC 20.

The multiple (e.g. dual) port nature of the memory 104 permits simultaneous read and write access to the entries within the memory 104. Each of these entries corresponds to a MIB counter, and will henceforth be referred to as MIB counters. Of the 64 MIB counters in a single memory 104, in the exemplary preferred embodiment only a subset of these MIB counters are actually used to maintain statistics counts. For example, only 39 of the 64 MIB counters are used in certain preferred embodiments.

One of the concerns in using a dual port memory which allows read and simultaneous writes, is the possibility of reading the MIB counter at the same address that is being concurrently written to. A read of this MB counter will therefore be inaccurate since the MIB counter is being updated by a write. The present invention prevents such an occurrence by the pipeline arrangement 106 and operates in conjunction with a controller 122 to ensure that read and writes to the same address (MIB counter) do not occur at the same time.

The pipeline 106 includes an arbitration stage 112 that receives in a first register 108 the address for the MIB counter that is to be updated to reflect events occurring in the network, as detected by the MAC 20. These addresses will be referred to as "MAC update addresses".

The arbitration stage 112 also includes a second register 110 that receives addresses from the data port register 100. These addresses are referred to as "CPU addresses", and may either be a "CPU read address" or a "CPU write address". A CPU read address is an address of a MIB counter in memory 104 which is to be read by the CPU 32. A CPU write address is an address of a MIB counter which is to be written to by the CPU 32. Each of the registers, 108, 110, are six-bit registers, corresponding to the number of possible MB counters within the memory 104. The two registers 108, 110 are coupled to the controller 122, which serves as an arbitrator to select either the MAC update address or the CPU address for continuing down the pipeline 106. The selected address continues down the pipeline from the output of a multiplexer 114, whose select line is controlled by the controller 122. The general rule in preferred embodiments is that the arbitration logic in the controller 122 favors the request that was not granted last cycle. In other words, if the MAC update address was granted the last cycle, the CPU address will be granted the next cycle. However, it is possible to provide a pre-hardwired threshold in a MAC event queue to continuously grant the MAC update addresses access through the pipeline 106 in order to flush the MAC event queue. When only one request is continuously asserted the arbitration logic in the controller 122 "parks" the grant.

Control bits are provided by the controller 122 in control latches 126. These control bits indicate whether the address flowing down the pipeline 106 is a MAC update address, a CPU read address or a CPU write address. Depending upon the different types of addresses, portions of the pipeline may be held (delayed) to prevent simultaneously reading and writing of the same address in the memory 104. The second stage in the pipeline 106 is the fetch stage 116. In this stage, if none of the control bits (MAC update address, CPU read address, CPU write address) are set in the latch 126, there is a pipeline bubble in register 116 and no operation is performed. When the control bits indicate that the address in the fetch stage 116 is a CPU write address, no operation is performed. However, when the control bits in latch 126 indicate that the address in the fetch stage 116 is either a MAC update address or a CPU read address, the MIB counter at the address in the memory 104 referenced by the 6-bit address in the in the register of the fetch 116 is read. It should be noted that there is only one address from the arbitration stage 112 that has reached this fetch stage 116, this address being the winner of the arbitration. Once any address reaches the fetch stage 116, it will continue down the pipeline 106 without any stalling. The value of the MIB counter that is read out of the memory 104 in response to a MAC update address or CPU read address is provided and stored in a current count register 130, a 32-bit data register.

In the third stage of the pipeline 106, an increment stage 118 is provided. The increment stage 118 includes an increment register that receives the address from the fetch stage 116. In this stage of operation, if the address in the increment stage 118 is a MAC update address, the contents of the current count register 130 are provided to an incrementor 132, which operates as a 32-bit incrementor. The output of the incrementor 132 is then provided to a next count register 134, which is a 32-bit data register.

When the address in the increment stage 118 is a CPU read address, no action is taken and the increment stage 118 acts as a flow-through stage. When the address in the increment 118 is a CPU write address, the data from the CPU data register port 100 is latched into a new count data register 140. This data will be subsequently written into the memory 104 in another operation. CPU 32 provides signals to indicate whether the register data port 100 contains the lower or upper 16 bits that the CPU 32 is attempting to write into the MIB counter.

The fourth and final stage of the pipeline 106 is a write back stage 120 that receives the address from the increment stage 118. In this stage, there is no operation if none of the control bits are set. The lack of set control bits thus indicates a pipeline bubble. When the control bits in latch 126 indicate that the address in the write back stage 120 is a MAC update address, the contents of the next count data register 134 are written into the MIB counter addressed by the MAC update address provided from the write back stage 120. The data is provided through a multiplexer 138. Hence, the MAC update address has been used twice in the pipeline operation. The MAC update address was first used as a read address (from the fetch stage 116) to cause the reading of a MIB counter. The contents of the MIB counter was updated and then the MAC update address was used as a write address (from the write back stage 120) to write-back the incremented contents to the same MIB counter from which the contents were originally read. This write address was provided two stages after the address was read. Since the writing occurs two stages after the reading from the same address occurs, the single operation does not present any concerns regarding simultaneous reading and writing of the same address.

When the address in the write back stage 120 is a CPU read address, as indicated by the control bits in latch 126, the write back stage 120 operates as a flow-through stage since no operation is performed.

When the address in the write back stage 120 is a CPU write address, the data contained in the new count data register 140 is provided through the multiplexer 138 to the specific MIB counter addressed by the CPU write address. Depending upon the value of the write bit enable signal provided by logic 142, only the upper 16 bits will be modified in the MIB counter, or the lower 16 bits.

If the operation in the pipeline 106 was is a CPU read operation, the data read from the memory 104 is provided through the current count register 130 and a multiplexer 136 to the data port register 100. A data ready signal 128 provides the signaling mechanism to the CPU 32 to indicate that the data register 100 contains data ready for reading by the CPU 32.

In order to prevent simultaneous reads and writes to the same address, comparator logic 124 is provided. Comparator logic 124 compares the address that is in the arbitration stage 112 (the winning address) with the address in the increment stage 118. When these addresses match, it is then determined whether a write will be attempted at the same time a read is attempted to the same address. If the operation in the arbitration stage 112 is not a CPU write address, and the operation in the increment stage 118 is not a CPU read address, and the two addresses match, a pipeline hold condition is reached. In other words, if the arbitration winning address currently in the arbitration stage is either a MAC update address or a CPU read address, either one of which will cause a read of a specific address in memory 104 at the fetch stage 116, is the same address as either a MAC update address or a CPU address in the increment stage 118, then a simultaneous read and write operation at the same address would occur. This is because the MAC update address and the CPU read address would attempt reading of an address in a memory 104 at the fetch stage at the same time either a MAC update address of CPU write address would be attempting to write the memory 104 at the same address from the write back stage 120.

In order to prevent this simultaneous reading and writing to the same address, the controller 122 inserts a pipeline "bubble" in the fetch stage 116 when it detects that the address in the arbitration stage 112 and the increment stage 118 are the same, and the operation in the arbitration stage is not a CPU write address and the operation in the increment stage is not a CPU read address. At the same time, the operation currently in the arbitration stage 112 is held and prevented from entering the fetch stage 116. A pipeline bubble is inserted into the fetch stage 116 and the control bits 126 corresponding to the fetch stage 116 are rewritten to indicate no operation. After the pipeline bubble has been inserted by the controller 122 into the fetch stage 116, operation may continue as before. However, since the pipeline bubble has been inserted, the write (performed either for the MAC update address or the CPU write address) will be allowed to complete before the read of that address (by either a MAC update address or a CPU read address) may be performed to the same address in the memory 104.

The present invention as described above provides fast operation, frees up memory bandwidth, matches the operating speed of the associated MAC, reduces the costs of the chip since flip-flops are not used, and controls the random access memory in an elegant manner while preventing simultaneous read and writes to the same address in the memory.

In this disclosure, there are shown and described only the preferred embodiments of the invention, but it is to be understood that the invention is capable of changes and modifications within the scope of the inventive concept as expressed therein.

What is claimed is:

1. A multiport network switch that maintains management information based (MIB) counters, comprising:
    a plurality of ports;
    a multiport random access memory which contains MIB counters at addressable locations in the memory;
    read/write logic coupled to the MIB counters to read and write specified MIB counters, the read/write logic including a pipeline having an input that receives addresses from the MIB counter to be read or written and pipelines the addresses to the memory;
    and control logic that selectively prevents concurrent reading and writing of the same MIB counter.

2. A multiport network switch that maintains management information based (MIB) counters, comprising:
    a plurality of ports;
    a multiport random access memory which contains MIB counters at addressable locations in the memory; and
    read/write logic coupled to the MIB counters to read and write specified MIB counters, the read/write logic including a pipeline having an input that receives addresses from the MIB counter to be read or written and pipelines the addresses to the memory,
    wherein the pipeline includes in sequence:
        an arbitration stage, forming the pipeline input, which arbitrates between addresses from different address sources;
        a fetch stage from which address of MIB counters to be read are provided to the memory;
        an increment that buffers addresses of MIB counters to be read; and
        a write back stage from which addresses of MIB counters that have been incremented and addresses of MIB counters to be written are provided to the memory.

3. The switch of claim 2, further comprising control logic that selectively prevents concurrent reading and writing of the same MIB counter.

4. The switch of claim 3, wherein the control logic includes an address comparator coupled to the pipeline to compare an address in the arbitration stage with an address in the incrementer stage.

5. The switch of claim 4, wherein the control logic includes pipeline bubble insertion logic that holds the address in the arbitration stage and inserts a pipeline bubble in the fetch stage as a function as a comparison of the addresses by the address comparator, and the sources of the addresses.

6. The switch of claim 5, wherein the arbitration stage includes a first register in which addresses from a media access controller (MAC) are received and a second register in which addresses from a central processing unit (CPU) are received.

7. The switch of claim 6, wherein a read/write logic further includes a controller coupled to the pipeline, the controller configured to arbitrate between addresses received at the first register and addresses received at the second register.

8. The switch of claim 7, wherein each address has an associated control bit indicating whether the address is:
    a MAC update address from a MAC to update a MIB counter;
    a CPU read address from a CPU to read a MIB counter; and
    a CPU write address from a CPU to write a MIB counter.

9. The switch of claim 8, further comprising an incrementor coupled to the memory to receive a count of a MIB counter addressed by a MAC update address upon the MAC update address being provided to the memory from the fetch stage; increment the count when the MAC update address is in the increment stage; and return the incremented count to the MIB counter addressed by the MAC update address upon, the MAC update address being provided to the memory from the write back stage.

10. The switch of claim 9, further comprising a new count register that receives a count from a CPU to be written into a MIB counter address by a CPU write address, the count being written into the MIB counter upon the CPU write address being provided to the memory from the write back stage.

11. The switch of claim 10, wherein the pipeline bubble insertion logic is configured to insert the pipeline bubble when: the address is in the arbitration stage and the address in the increment stage are equal; the address in the arbitration stage is not a CPU write address; and the address in the increment stage is not a CPU read address.

* * * * *